United States Patent [19]

Harrison

[11] Patent Number: 5,569,113

[45] Date of Patent: Oct. 29, 1996

[54] TRANSMISSION WITH A CONTINUOUSLY VARIABLE ADJUSTABLE RATIO

[76] Inventor: John W. Harrison, 5546 N. Sixth St., Fresno, Calif. 93710

[21] Appl. No.: 291,310

[22] Filed: Aug. 15, 1994

[51] Int. Cl.$^6$ .............................. F16H 15/10; B62M 1/02
[52] U.S. Cl. ............................ 476/58; 74/594.2; 280/260
[58] Field of Search ......................... 476/24, 58; 74/351, 74/594.2; 280/260

[56] References Cited

U.S. PATENT DOCUMENTS

| | | | |
|---|---|---|---|
| 536,550 | 3/1895 | Snyder | 74/351 X |
| 583,500 | 6/1897 | Mueller | 476/58 X |
| 723,228 | 3/1903 | Banwell | 74/351 |
| 743,133 | 11/1903 | Bacon et al. | 74/351 |
| 3,464,281 | 9/1969 | Azuma et al. | 74/200 |
| 3,875,814 | 4/1975 | Steuer | 74/194 |
| 3,934,481 | 1/1976 | Foster | 74/190.5 |
| 4,137,785 | 2/1979 | Virlon | 74/194 |
| 4,270,400 | 6/1981 | Fodor | 74/194 |
| 4,955,247 | 9/1990 | Marshall | 280/260 X |
| 5,228,710 | 7/1993 | Lu | 280/260 |
| 5,236,403 | 8/1993 | Schievelbush | 476/38 |

Primary Examiner—Allan D. Herrmann

[57] ABSTRACT

A transmission with a continuously variable adjustable ratio comprising a first disk fixedly coupled to a first shaft, and a second disk coupled for a rotation about the axis of the first disk. A second shaft is supported for rotation about an axis essentially parallel to the face of the first disk wherein said axis is supported in a tilted position relative to the planar face of the first disk such that the distance between said axis and the first disk planar face increases from said disk center to said disk edge. An idler is coupled for rotation about and axial movement along each second shaft and is in frictional contact with the first disk face. A pinion is fixedly coupled to each second shaft and interconnects with the face of the second disk. Thus, idler axial movement along the second shaft varies both the relative rotational speeds between the first and second disks and the frictional contact pressure between the idler and the first disk face. The relative size of idler to pinion determines the ranges of ratios achieved. The transmission has low frictional losses and is therefore highly efficient, thereby extending service life.

5 Claims, 4 Drawing Sheets

5,569,113

TRANSMISSION WITH A CONTINUOUSLY VARIABLE ADJUSTABLE RATIO

FIELD OF THE INVENTION

The present invention relates to transmissions in general and human-powered transmissions in particular.

BACKGROUND OF THE INVENTION

Human-powered vehicles to the present time have relied upon and made use of a discrete set of power transfer ratios to obtain torque during acceleration and power at high speeds. While this has been effective there has been a long-felt need for a more efficient means of transferring and utilizing the limited power available. The present invention addresses this specific issue through the ability to adjust the speed ratio to meet specific requirements and/or demands at any instant in time. Another advantage of the present invention is the ability to retrofit to the widest range of human-powered vehicle applications due to its light-weight compact design.

While there are several examples of continuously variable transmissions of similar design, such prior art devices as are disclosed in the U.S. Pat. No. 4,270,400, issued to Fodor on Jun. 2, 1981 and 4,137,785, issued to Virlon on Feb. 6, 1979, these mechanisms relate to the automotive industry. Thus, these devices are heavy-duty in nature, bulky in design, and are not appropriate for a human-powered vehicle, for example a bicycle or a wheelchair. Other prior art devices as are disclosed in the U.S. Pat. No. 3,934,481, issued to Foster on Jan. 27, 1976 and 3,863,503, issued to Nelson in October of 1960 are appropriate for a bicycle but are complex in design requiring a number of precision-machined components and would not be applicable to other human-powered vehicles, for example a wheelchair. These prior art devices maintain a sufficient frictional contact pressure through either a constant overload of the contact pressure between each idler and disk face, or use of a complex mechanism to sense and control this contact pressure at any given point in time. Thus, service life is shortened through either high frictional wear or the addition of complex precision-made components.

There are examples of other drive mechanisms, such as U.S. Pat. No. 583,500, issued to Mueller in June 1897, 723,228, issued to Banwell in March 1903, and 4,955,247, issued to Marshall in September 1990. While each of these may be applicable to a human-powered vehicle, none is sufficiently compact or lightweight to be practical in current bicycle or wheelchair designs, each requiring extensive modifications to the supporting flames of the target vehicle. There are other examples of drive mechanisms which might be considered as appropriate for existing frame designs, such as U.S. Pat. No. 536,550, issued to Snyder in March 1895, and 743,133, issued to Bacon in November 1903. These devices are positive in drive nature, suffering the inability to reach a broad range of precision ratios, and offer no clear benefit over currently existing technology.

The present invention provides variable contact pressure between idler and disk, enforcing higher contact pressure at lower speed ratios, when the potential torque demands are at a maximum. Conversely, at higher speed ratios, when the potential is minimized, the contact pressure is lessened. This functionality is achieved through a simplified means requiring a minimum of precision-made components, thereby extending service life.

SUMMARY OF THE INVENTION

Accordingly, it is the primary object of the present invention to provide a continuously variable transmission which is highly efficient and has a long service life.

Another object of the present invention is to provide such a transmission which minimizes frictional losses and excessive wear with regard to the contact pressure between an idler and a disk.

Another object of the present invention is to provide such a transmission in which there is the flexibility to achieve a wide range of ratios.

Another object of the present invention is to provide such a transmission which is light in weight.

Another object of the present invention is to provide such a transmission which is compact in design.

Another object of the present invention is to provide such a transmission in which the speed ratio control allows for the flexibility desirable in a human-powered vehicle.

Another object of the present invention is to provide such a transmission in which there is the ability to retrofit to a large number of existing bicycle and wheelchair designs.

The foregoing objects are attained by providing a continuously variable adjustable transmission of the type having a first disk fixedly coupled to a first shaft, and having a planar face; a second disk which is coupled for free rotation about the rotational axis of the first disk; a second shaft; an idler being coupled for both rotation about and axial movement along the second shaft and being in frictional contact with the first disk planar face; a pinion fixedly coupled about the second shaft and being interconnected with the second disk planar face; a means of support for rotation of the second shaft about its longitudinal rotational axis, essentially parallel to the planar face of the first disk, wherein said axis is supported in a tilted position relative to the planar face of the first disk such that the distance between said axis and the first planar face increases from said disk center to said disk edge. This supporting means controlling the contact pressure between the idler and the disk to keep it to a minimum, reducing frictional losses of power and excessive wear between the idler and the disk. The force tending to make the contact pressure between the idler and the disk proportional to the torque transmitted by the idler and therefore does not overload the contact point therebetween.

While the present invention is especially advantageous for a human-powered vehicle, such as a bicycle or wheelchair, it could apply to any case where there is a need for efficient transmission of power at varying speed ratios.

Further objects and advantages of the present invention will become apparent from a consideration of the drawings and ensuing description.

DRAWINGS

Referring now to the drawings which form a part of this original disclosure;

Figure 1:
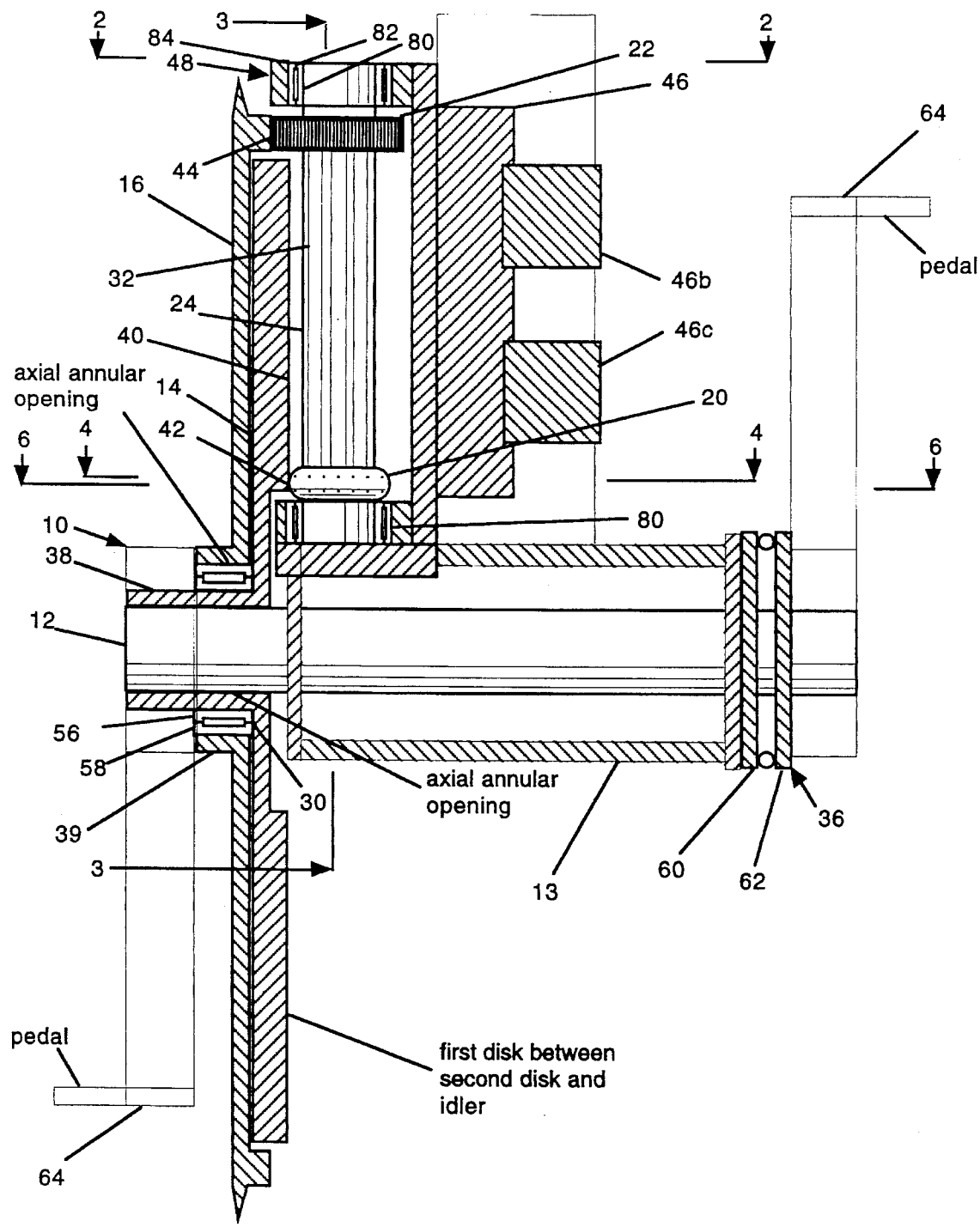
FIG. 1 is a longitudinal sectional view of the continuously variable adjustable transmission in accordance with the present invention.
Figure 2:
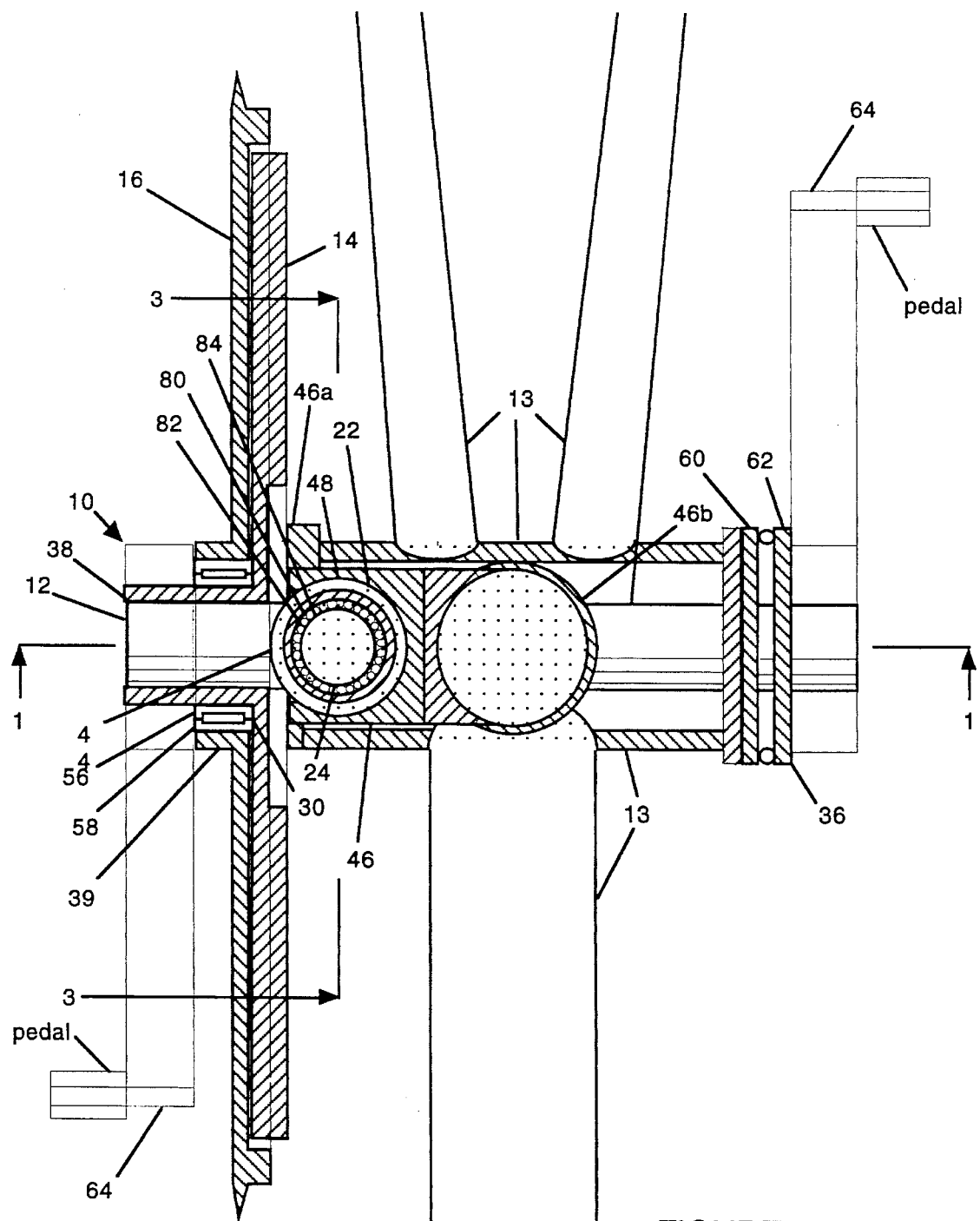
FIG. 2 is a longitudinal view of the transmission taken in the direction of line 2—2 of the FIG. 1.
Figure 3:
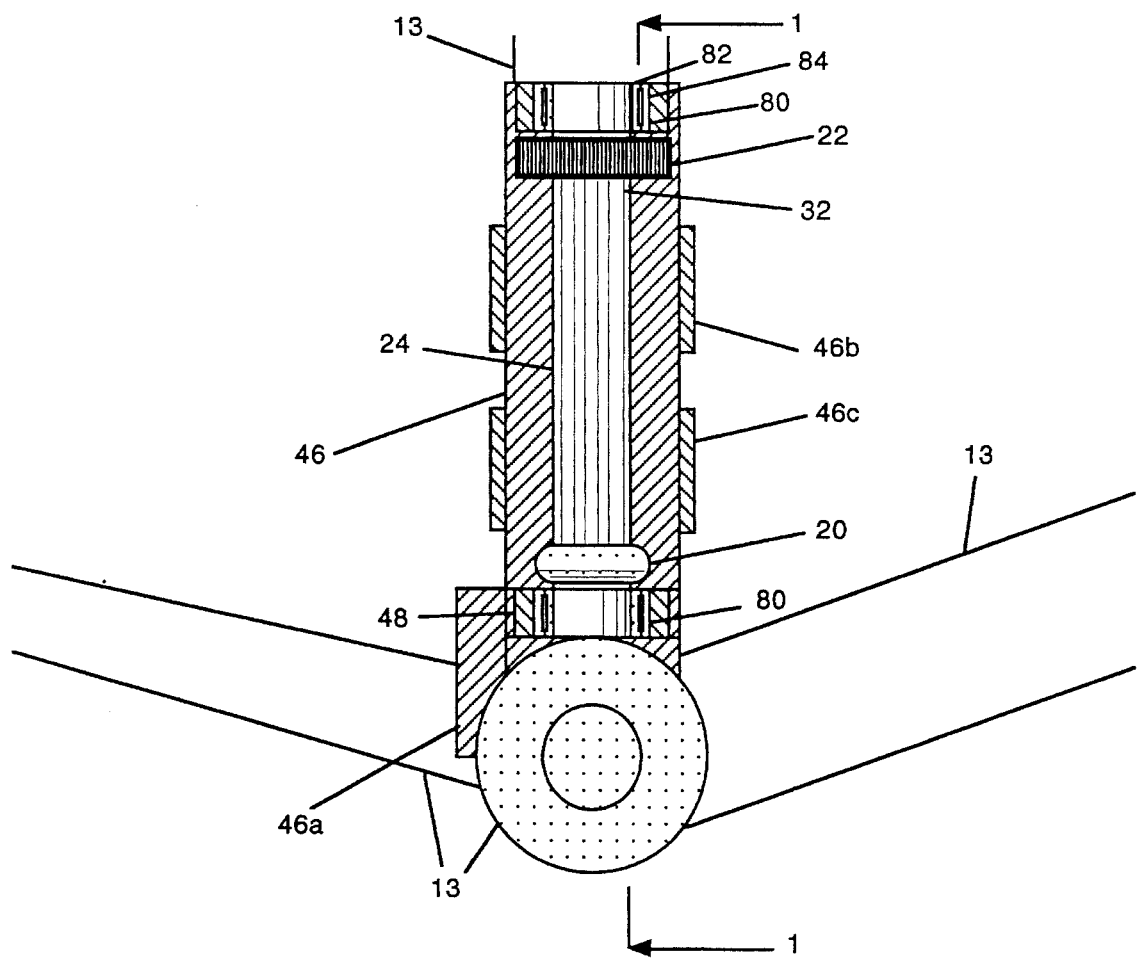

FIG. 3 is a fragmentational view of the transmission taken in the direction of line 3—3, showing aspects of the ratio control assembly and its position in relation to the external support structure 13 taken in the direction of line 3—3 of the FIGS. 1 and 2.

Figure 4:
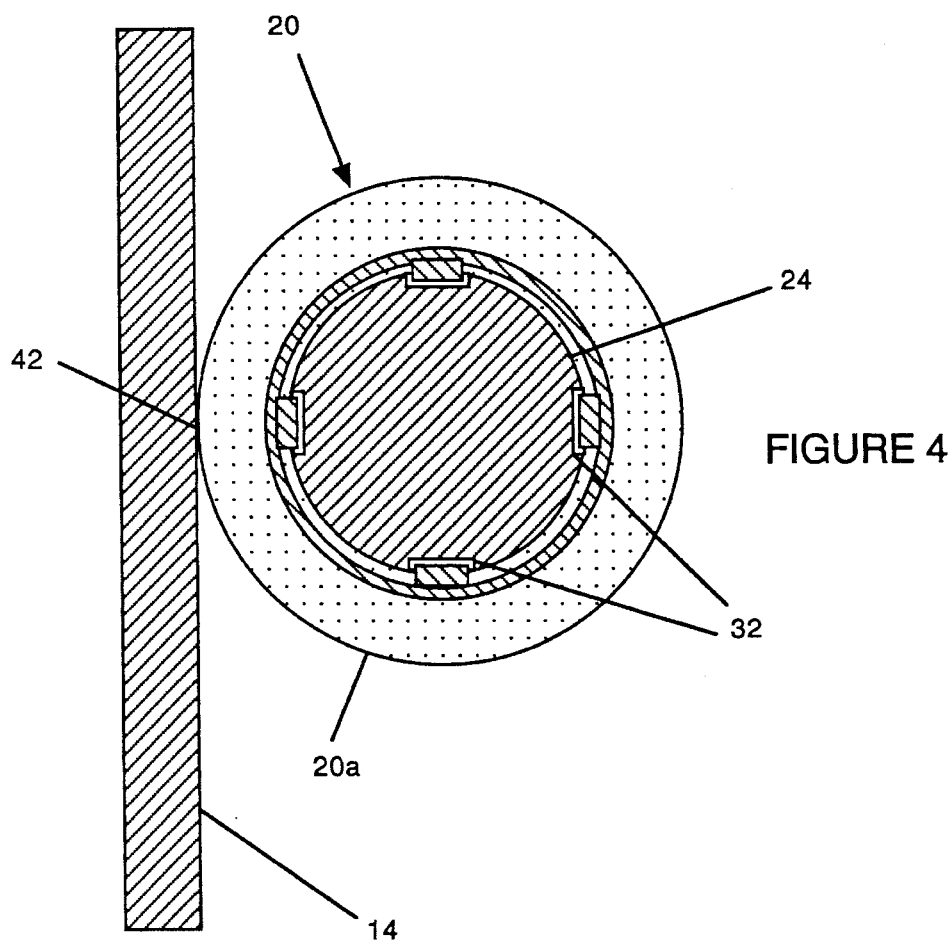

FIG. 4 is a fragmentational view of the idler member 20 taken in the direction of line 4—4 of the FIGS. 1 and 2.

Figure 5:
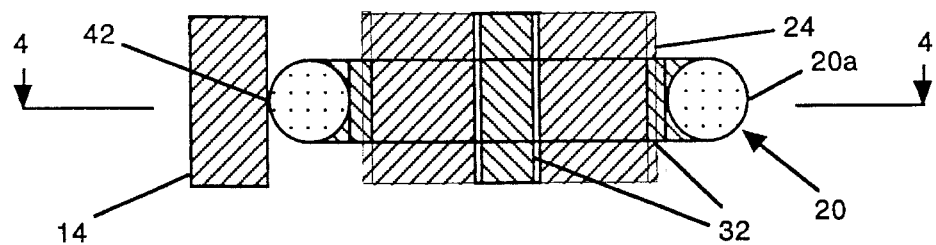

FIG. 5 is a fragmentational view of the idler member 20 taken in the direction of line 5—5 of the FIG. 4.

DETAILED DESCRIPTION OF THE INVENTION

Referring to FIGS. 1 and 2, an embodiment of the continuously variable adjustable transmission 10 of the present invention is shown as it could be used on a bicycle. It includes a disk 14 fixedly coupled to a shaft 12 carried in an external support structure 13 that could be a bicycle frame for example, and a disk 16 that could be a chain-driven sprocket of a bicycle for example, and is integrally formed with a sleeve 39 and coupled for free rotation about the axis of the disk 14, driven by an assembly means comprising a support element 46, an idler 20 and a pinion 22 coupled with a second shaft 24 supported for rotation about its longitudinal rotational axis.

Referring to FIGS. 1, 2, 4, and 5, the idler 20 has a central aperture 20b therein which is slotted to correspond with the slots or splines 32 on the outside surface of the shaft 24 so that idler 20 rotates with shaft 24 but is axially moveable along the shaft. The curved periphery of the idler 20 is in frictional contact with the planar face 40 of disk 14 at a contact point 42 and therefore upon rotation of disk 14 idler 20 will rotate. A pinion 22 is fixedly coupled to the shaft 24 and rotates therewith, said pinion being interconnected with the disk 16 at a contact point 44 so that upon rotation of the pinion 22, the disk 16 will rotate.

Referring to FIGS. 1, 2, and 3, an assembly means comprises a support element 46. The support elements 46b and 46c interconnect with the element 46 to fixedly couple said element to the external support structure 13. A support member 46a is integrally formed with said element to provide additional stability against the external support structure 13. The element 46 comprises a shaft 24 supported for rotation about an axis with each end being received in a bearing assembly 80 comprising an inner race 82 and outer race 84, a plurality of needle bearings being interposed between these races. In so mounting, the shaft 24 is capable of rotation about its longitudinal rotational axis essentially parallel to the planar face of 40 of the disk 14, wherein said axis is supported in a tilted position relative to the planar face 40 of the disk 14 such that the distance between said axis and the planar face 40 of the disk 14 increases from said disk center to said disk edge. This supporting means enforcing increasing frictional contact pressure between the idler 20 and the planar face 40 of the disk 14 as said idler moves towards the center of said disk. Conversely, as said idler moves to a greater radial position relative to the planar face 40 of the disk 14, the frictional contact pressure between said idler and said disk planar face will decrease.

As seen in FIGS. 1 and 2, the shaft 12 is supported for the thrust load in opposition to the frictional contact pressure between the idler 20 and the planar face 40 of the disk 14 through means comprising a bearing assembly 36 contacting an external support structure 13 and comprising an upper race 62 fixedly coupled to the shaft 12 and a lower race 60, a plurality of ball bearings being interposed between theses races. A bicycle crank 64 and pedal could be affixed to each end of shaft 12 for rotation of said shaft.

In accordance with one mode of operation, the disk 14 is integrally formed with a sleeve 38 being fixedly coupled to a shaft 12 and the disk 16 is coupled for free rotation about said sleeve portion through means comprising a bearing assembly 30.

Referring to FIGS. 1 and 2, a bearing assembly 30 is comprised of an outer race 58 received about the longitudinal rotational axis of the disk 16, and an inner race 56 which fits snugly over the sleeve portion 38 of the disk 14, a plurality of needle bearings being interposed between these races.

OPERATION

The basic purpose of the transmission of the present invention is to provide a continuously variable adjustable speed ratio between the disk 14 and the disk 16, while maintaining a sufficient, but minimal frictional contact pressure between the idler 20 and the planar face 40 of the disk 14, thereby increasing efficiency and extending service life.

In order to vary the relative rotational speeds of the disk 14 and the disk 16, the radial location of the contact point 42 of the idler 20 relative to the disk 14 is varied. Thus, when the idler 20 is moved to a greater radial position relative to the center of the planar face 40 of the disk 14, said idler and its associated shaft 24 will rotate faster. Consequently, the disk 16 will rotate more quickly due to the interconnection of each associated pinion 22 with the disk 16. Conversely, when the idler 20 is axially moved along the shaft 24 towards the center of the disk 14, i.e., closer to the longitudinal rotational axis of the disk, the idler 20 will rotate more slowly, as will the disk 16.

In order to maintain a sufficient, but minimal frictional contact pressure between the idler 20 and the planar face at contact point 42, the shaft 24 is supported for rotation about its longitudinal rotational axis essentially parallel to the planar face 40 of the disk 14, wherein said axis is supported in a tilted position relative to the planar face 40 of the disk 14 such that the distance between said axis and the planar face 40 of the disk 14 increases from said disk center to said disk edge. Thus, as the associated idler 20 is axially moved to a greater radial position away from the center of the planar face 40 of the disk 14, the frictional contact pressure between said idler and said disk planer face will decrease. Conversely, as the idler 20 is axially moved along the shaft 24 towards the center of the disk 14, i.e., closer to the longitudinal rotational axis of the disk, the frictional contact pressure between said idler and the planar face 40 of the disk 14 will increase, thereby the greater frictional contact pressure is applied when the greater torque is experienced, thus over a period of use, transmission component life is extended.

While advantageous embodiments have been chosen to describe the invention, it will be understood by those skilled in the art that various changes and modifications can be made therein without departing from the scope of the invention as defined in the appended claims, such as for example a friction drive can be substituted for the pinion drive and vise-versa, a plurality of assemblies could be provided in place of the single assembly, and of course what are the driver or driven members can be reversed.

What is claimed is:

1. In a continuously variable transmission, comprising:

a support structure;

a first shaft, rotatably carried by said support structure;

a first disk having a planar face and an axial annual opening for receiving said first shaft, said first disk being fixed to said first shaft for rotation therewith;

a second disk having an axial annual opening for receiving said first shaft and being coaxially supported by said first shaft for rotation relative to said first shaft, and positioned adjacent to said first disk; and assembly means carried by said support structure, said assembly means including a second shaft mounted transversely to the axis of said first shaft, and supported for rotation by said support structure, and a pinion coupled to said second shaft for rotation therewith and in contact with a portion of the surface of said second disk, so that rotation of said second shaft will rotate said second disk, and an idler fixed to said second shaft for rotation therewith, and movable axially along said second shaft in frictional contact with the planar face of said first disk, so that radial movement of said idler toward the outer circumference of said first disk will increase the speed of said second disk.

2. In a continuously variable transmission as set forth in claim 1, wherein said first shaft extends through said annular openings in said first and said second disks so that either end of said first shaft may be used to rotate said first disk.

3. In a continuously variable transmission as set forth in claim 1, wherein said second disk is positioned adjacent to said first disk and said first disk is positioned between said second disk and said idler so as to provide a compact transmission trait.

4. In a continuously variable transmission as set forth in claim 1, whereto said first disk and said second disk rotate in a common direction.

5. In a continuously variable transmission as set forth in claim 1, wherein said support structure positions said second shaft of said assembly means in a tilted position relative to said first disk such that the distance between the longitudinal rotational axis of said second shaft and said first disk planar face increases from said disk center to said disk edge.

* * * * *